May 10, 1932.  E. W. TAYLOR  1,857,612
CARD AND LIKE INDEXING, SORTING, TABULATING, AND LIKE APPARATUS
Filed April 7, 1930  7 Sheets-Sheet 1

Fig. 1.

WITNESS
George Du Bon

INVENTOR
EDGAR W. TAYLOR
BY Richards & Geier
ATTORNEYS

Fig. 3.

May 10, 1932.  E. W. TAYLOR  1,857,612
CARD AND LIKE INDEXING, SORTING, TABULATING, AND LIKE APPARATUS
Filed April 7, 1930   7 Sheets-Sheet 4

May 10, 1932.    E. W. TAYLOR    1,857,612
CARD AND LIKE INDEXING, SORTING, TABULATING, AND LIKE APPARATUS
Filed April 7, 1930    7 Sheets-Sheet 7

INVENTOR
EDGAR W. TAYLOR
BY
ATTORNEYS

Patented May 10, 1932

1,857,612

UNITED STATES PATENT OFFICE

EDGAR WORRALL TAYLOR, OF BIRMINGHAM, ENGLAND, ASSIGNOR TO INFALLIBLE CARD SELECTING COMPANY LIMITED, OF BIRMINGHAM, ENGLAND

CARD AND LIKE INDEXING, SORTING, TABULATING, AND LIKE APPARATUS

Application filed April 7, 1930, Serial No. 442,221, and in Great Britain May 7, 1929.

This invention relates to selective card or like filing cabinets or containers in which any desired card, tablet or other like element may be selected and removed from a pack or number of elements irrespective of the position which it may occupy in the pack; the said apparatus being of the kind having means for holding or locking a pack or number of cards, tablets or other like elements within a cabinet or container and also means for selecting and releasing any particular element, from the holding or locking means to enable such element to be removed.

The invention, however, is particularly applicable to card index cabinets of the kind described and claimed in Patent No. 1,702,994, Feb. 19, 1929, granted to Walter Buckeridge, in which the required card could be selected by the operation of rods engaging gaps or apertures in the cards, such gaps or apertures having narrow or restricted parts or entrances and the rods having, in cross-section, a long and a short axis, so that they are incapable in one position of passing through the narrower portion of the gaps but are adapted, on being turned into another position, of passing through the said narrower portions of the gaps to permit of the cards being removed. Although the invention is particularly applicable to card index cabinets of the above type, it may also be applied to any selective card or like filing cabinet or container in which a particular element may be removed from a pack after having been selected and released from the holding means.

The object of the present invention is to provide means whereby the selected element can be positively lifted or removed from the pack without the necessity of inverting the apparatus, as was the case with the card index cabinet described in Patent No. 1,702,944.

According to the invention, the cards or other elements to be selected and removed are individually supported upon or above a series of separate movable ejecting members which are adapted to act upon and eject any desired element as soon as the latter has been released from its locking or holding device by the operation of appropriate selecting and releasing means. The ejecting members are preferably spring-actuated, and are normally held inoperative upon the cards or other elements by mechanism which is adapted to render the said members operative when it is desired to remove a given element. Thus, the ejecting members may consist of vertically-movable slides tending to be raised by springs but normally held in a lowered position by levers drawn down by springs which overcome the resistance of the springs acting upon the ejectors, the said levers being adapted to be raised by cams or the like operated by suitable means so as thereby to relieve the downward pressure upon the ejector slides which thus press upwards upon the cards or other elements and eject or raise any element that may have been selected and released.

Figure 1:
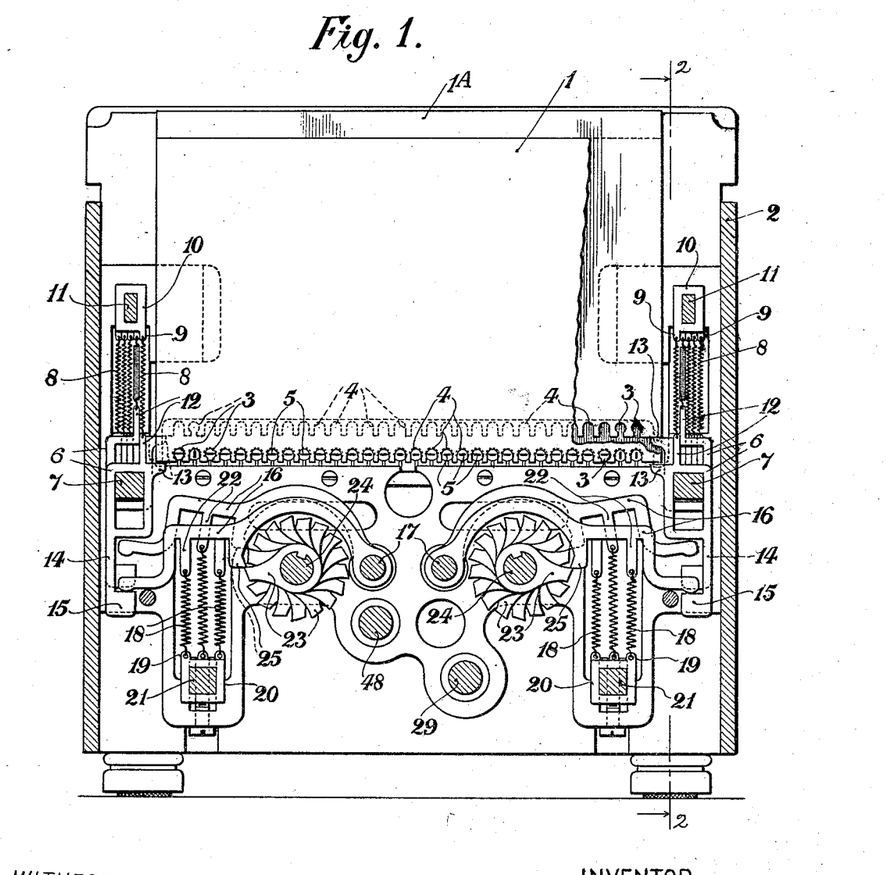
Figure 1 of the accompanying drawings represents a cross-section through a card cabinet provided with card-ejecting means in accordance with the present invention, one of the cards being shown partly broken away to illustrate a card behind in its raised or ejected position.

Referring to the drawings, which illustrate the invention in connection with a card index cabinet having card selecting, locking and releasing means as described in Patent No. 1,702,994, the cards 1 are placed vertically in a box-like cabinet 2 and have their lower edges formed with a series of gaps or apertures corresponding to different numerals, letters or other characters as described in the said patent, such gaps 3 which correspond to the numerals, letters or other characters making up the number, name or other characteristic appertaining to any individual card having restricted entrances, while the remainder 4 are parallel-sided, all of them being engaged by rotatable rods 5 each having a long and a short axis in cross-section, so that by giving a quarter turn to the appropriate rods the latter are placed in a vertical position such that the desired card is released and can be withdrawn. In Figure 1 three of the rods are shown in a vertical position to release the card 1ª which is indicated in a raised position. In order positively to eject a released card, the whole of the cards in the cabinet are supported upon individual ejectors in the form of thin rectangular or other metal frames 6 disposed side by side in two longitudinal series, one at each side of the cabinet. These frames 6 constitute slides, being adapted to slide vertically upon rectangular horizontal guide bars 7, and each being adapted to be raised individually by a vertical tension spring 8 anchored at its upper end to a lug 9 on an anchoring plate 10 threaded on a bar 11, and attached at its lower end to a lug 12 upon the upper edge of the slide 6.

Groups or sets of any suitable number of adjacent slides (for example, as shown, groups or sets of five) may have the lugs 12 to which the springs are attached, successively displaced laterally relatively to one another, the lugs 9 on the plates 10 being correspondingly displaced, whereby the springs of each group may be disposed side by side in the transverse direction of the cabinet, but slightly staggered or displaced in the longitudinal direction relatively to one another by amounts corresponding to the thickness of the slides. Thus the springs can be arranged in a neat and compact manner and can be made of a sufficiently large diameter to have the required strength for efficiently operating the slides. The long lugs 12 upon the slides determine the length of the upward movement of the said slides.

Figure 2:
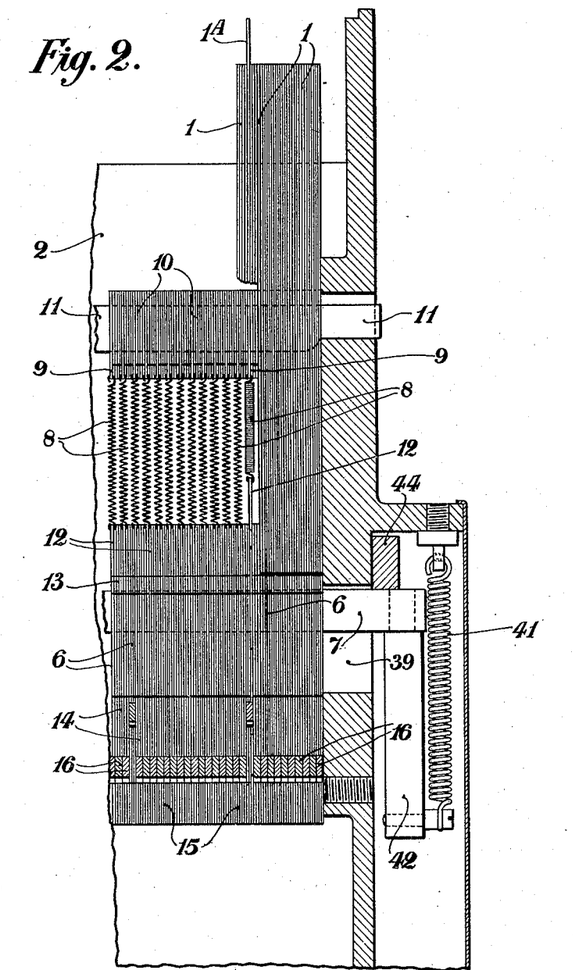
Figure 2 is a longitudinal vertical section through one end of the cabinet on the line 2—2 of Figure 1 and through a number of the levers for releasing the cards, a number of the cards being represented in edge view with one of them raised, and some of the springs and lifting slides being shown also in edge view.
Figure 3:
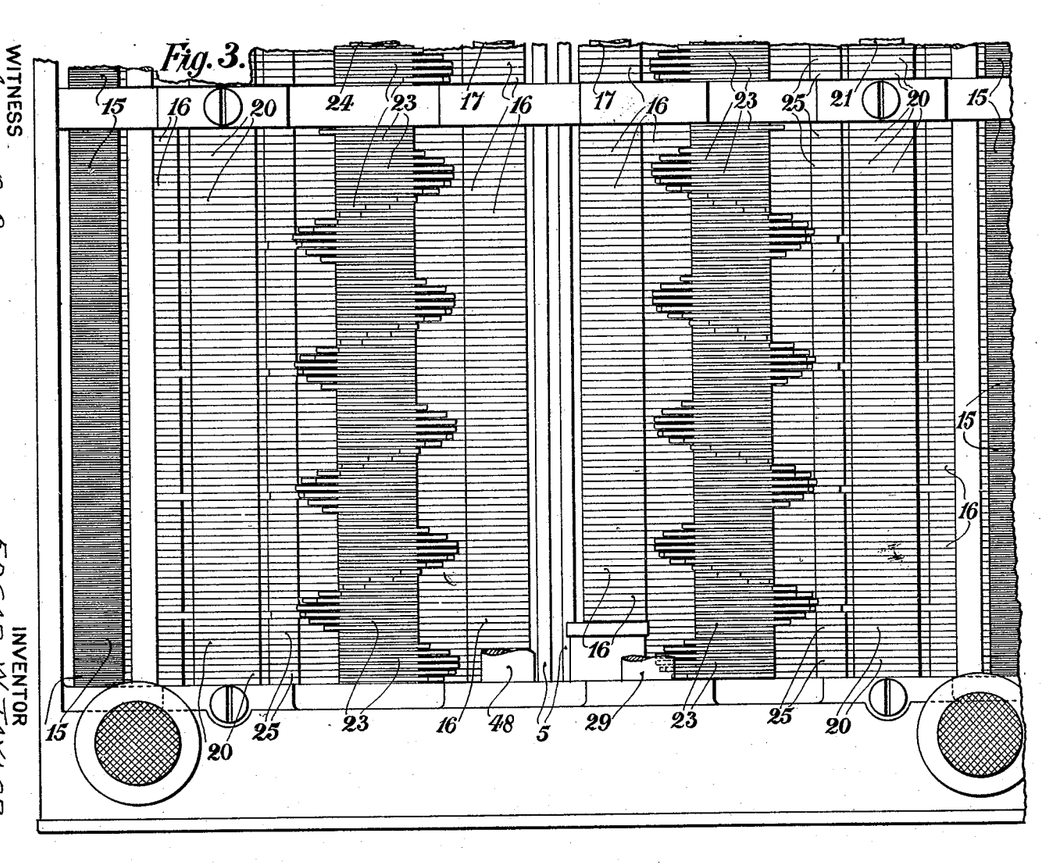
Figure 3 is an underside view of one end portion of the cabinet on an enlarged scale showing the arrangement of the cams.

Each slide 6 has a forward horizontal lug 13 at its upper end, extending towards the interior of the cabinet, and adapted to support or lie beneath an individual card. Thus the normal tendency of the springs 8 is to raise the slides 6 against the lower edges of the cards 1 and lift any card that may have been released by the operation of the rods 5. Normally, however, the ejector slides 6 are held inoperative upon the cards, and for this purpose each slide is provided with a depending shank 14 terminating in a horizontal projection 15 extending inwards towards the interior of the cabinet. Lying upon and engaging the said projection 15 of each slide is the outer end of a horizontally-disposed lever 16, a series of such levers being pivoted side by side upon a common longitudinal shaft 17 and each being wide enough to act upon a plurality of slides (such as three or other suitable number) simultaneously, two sets of levers being employed one at each side of the cabinet for controlling the respective sets of ejector slides at opposite sides, each said set of levers being mounted upon a separate shaft 17, 17. The levers are drawn downwards by separate coiled tension springs 18 anchored at their lower ends to lugs 19 on plates 20 threaded side by side on a bar 21 and connected at their upper ends to depending lugs 22 on the respective levers, the said lugs being successively staggered in groups of three or more to allow of the springs being disposed in three or more rows. The said springs 18 are sufficiently strong to overcome the resistance of the springs 8 acting on the ejector slides, so as thereby to lower the latter. The levers 16 are adapted to be raised, in order to render the ejectors 6 operative upon the cards, by means of cams 23, one for each lever, a series of such cams being keyed side by side upon a rotatable shaft 24, two sets of cams being employed one for each set of levers, each set being fixed upon a separate rotatable shaft 24, 24. Each cam 23 is adapted to engage and wipe past a lug or nose part 25 on the respective lever 16, which latter may be bowed or arched to permit of the rotation of the cam after wiping past the lug, thus allowing the levers to return to their original position; and adjacent cams are slightly angularly displaced relatively to one another, in spiral form, as shown in Figures 1 and 3, so that when the cam shaft 24 is rotated the cams in each pitch length of the spiral formation come into operation in succession and cause the corresponding sets of ejector slides controlled by the respective levers, to be released in succession and then re-engaged by the levers until all the slides in the cabinet have been so released and re-engaged. When the slides 6 beneath opposite ends of the card such as the card 1ª, that has been unlocked or released by the rods, thus become operative, they press the said card upwards above the other cards in the pack, as shown in Figures 1 and 2, and thus it can be easily removed by hand.

Figure 5:
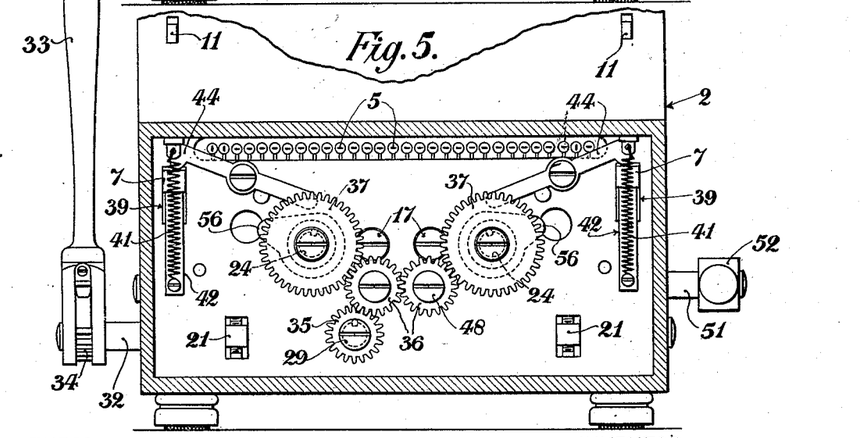
Figure 5 is a sectional elevation of the opposite end of the apparatus on the line 5—5 of Figure 7.
Figure 6:
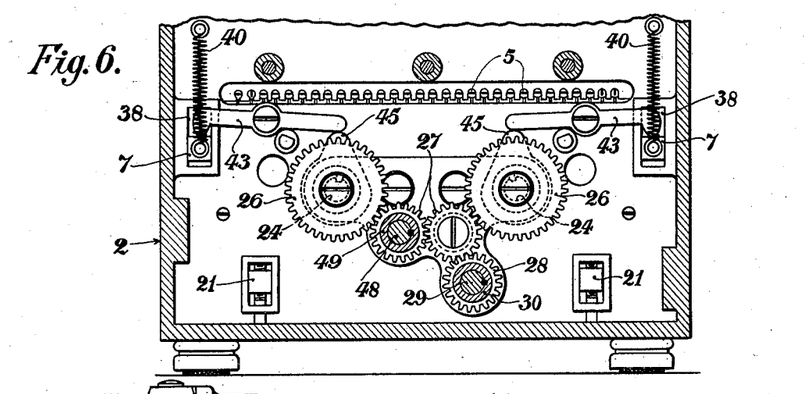
Figure 6 is a vertical section through the front end of the machine on the line 6—6 of Figure 7, showing the gearing for rotating the cam shafts and the cam mechanism for lowering the card-supporting slides, the cams being shown in operation.
Figure 7:
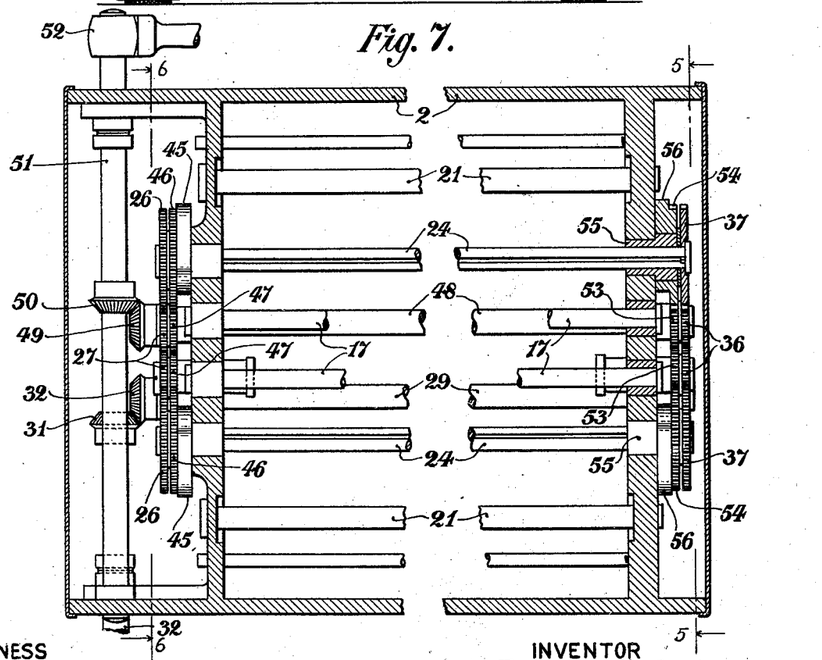
Figure 7 is a horizontal section through the lower part of the apparatus on the line 7—7 of Figure 4 to show the interconnected gearing at the front and back, the cams on the cam shafts being omitted.

The two cam shafts 24, 24, are geared together at opposite ends and through further gearing they are adapted to be operated simultaneously from a common actuating lever situated outside the cabinet. Thus, the shafts 24 are mounted to rotate in bearings in the end walls of the cabinet, and at their forward ends carry spur-wheels 26, 26, respectively, which are coupled together by intermeshing pinions 27, 27, one of which is engaged by a pinion 28 on the same shaft 29 as a bevel wheel 30 gearing with a bevel-wheel 31 on a transverse shaft 32 adapted to be rotated by a lever 33 through a pawl-and-ratchet device 34. The shaft 29 extends to the rear end of the cabinet and carries at that end a pinion 35 (see Figure 5) gearing with intermeshing wheel 36, 36, respectively engaging spur-wheel 37, 37, on the rear ends of the cam-shafts 24, 24. By operating the lever 33 the said shafts 24, 24, are rotated step by step from opposite ends and in opposite directions.

Should an ejector slide 6 stick in a raised position after having ejected a card, such as if a lever jams between the slides, it may be lowered and the mechanism restored in its proper working condition, by making the guide rods 7 of the slides movable in a downward direction, so as thereby to draw down the raised slide. For this purpose the said rods 7 are capable of a vertical movement in slots 38 at the front of the cabinet and in slots 39 at the rear end. They are normally held at the top of the slots by tension springs 40 at the front, connected directly to the rods, and by springs 41 at the rear connected to depending parts 42 carried by the rods. The rods are adapted to be lowered when required by levers 43, 43, at the front and by similar levers 44, 44, at the rear, their ends engaging the top faces of the rods. The levers 43 at the front are operated by cams 45, 45, carried by spur-wheel 46, 46, mounted behind the spur-wheels 26, 26, upon bushes surrounding the shafts 24, 24. The wheels 46 gear with intermeshing wheels 47, 47, mounted behind the wheels 27, 27, one of the wheels 47 being upon a longitudinal shaft 48 carrying a bevel-wheel 49 gearing with a bevel-wheel 50 on a transverse shaft 51 adapted to be partially rotated by a lever 52. The shaft 48 extends to the rear of the cabinet and at its rear end carries one of two intermeshing wheels 53, 53, mounted behind the wheels 36, 36, and gearing with spur-wheels 54, 54, mounted behind the wheels 37, 37, upon bushes 55, 55, the said wheels 54, 54, carrying cams 56, 56, which can engage the levers 44, 44. By operating the external lever 52 the cams 45, 56, may be turned so as to operate the levers 43, 44, to cause them to depress the rods 7 and thereby lower any slides that may be remaining in their raised position.

Figure 4:
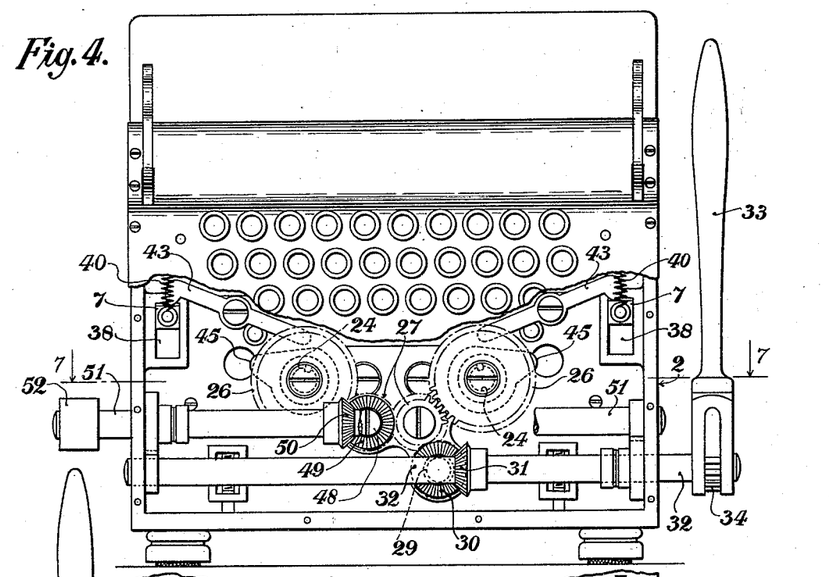
Figure 4 is a front elevation of the cabinet with the end cover-plate or key-board partly broken away to show the gearing for operating the cams and lowering the card-supporting slides.
Figure 8:
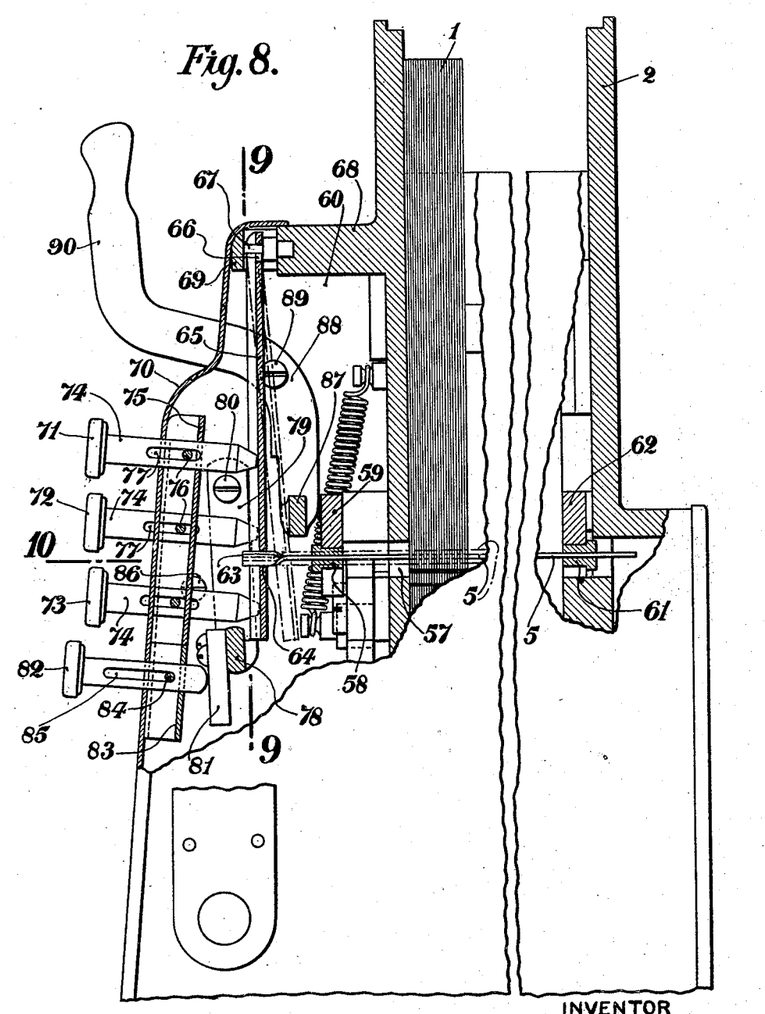
Figure 8 is a longitudinal section through the upper portion of the cabinet on the line 8—8 of Figure 4.
Figure 9:
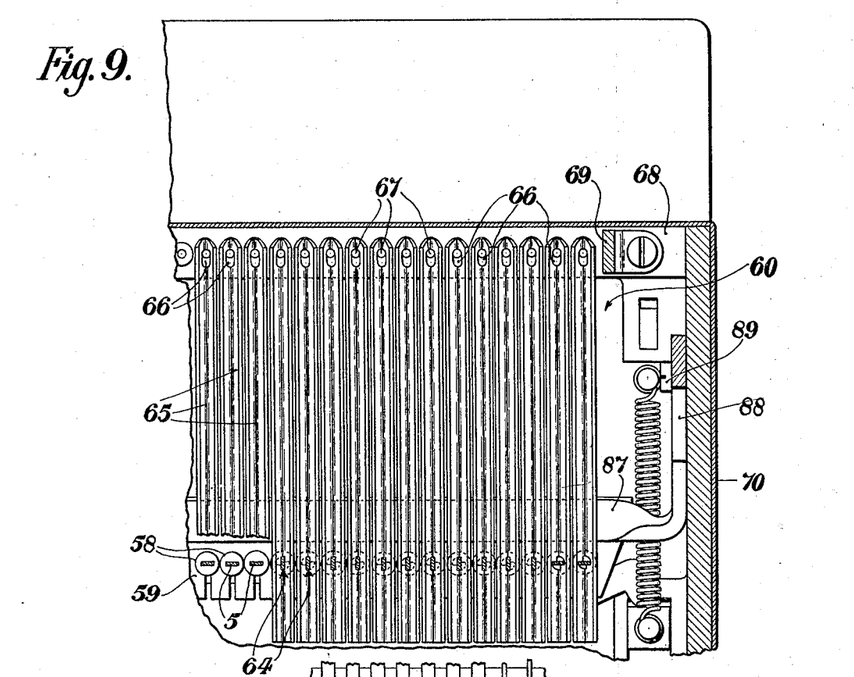
Figure 9 is a vertical section through the front ends of the card-engaging rods, on the line 9—9 of Figure 8, the front cover being removed, showing the rod-operating levers in elevation.
Figure 10:
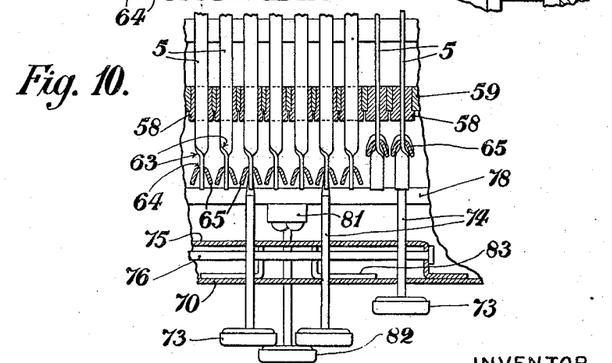
Figure 10 is a horizontal section through the front cover and rod-operating levers, on the line 10—10 of Figure 8, showing the card rods in plan.

The card-holding rods 5 may be rotated to release any desired card by any suitable means. They may, for example, be rotated by imparting an axial movement to them as described in the hereinbefore-mentioned Patent No. 1,702,994, the ends of the rods being twisted and being arranged to slide through slots in the casing. Conveniently, however, the mechanism illustrated particularly in Figures 8 to 10 and in Figure 4 is employed. Thus, the forward ends of the rods 5 extend through a slot 57 in the front wall of the main box 2 and are soldered or otherwise fixed within shouldered collars 58 rotatably mounted in bearing apertures in a transverse bar 59 supported upon the end wall of the cabinet and contained within an extension chamber 60 thereof. At the rear end of the cabinet (see Figure 8) the rods 5 are similarly fixed in rotatable shouldered bearing collars 61 mounted in apertures in a bar 62 fixed to the end wall, and they are thus prevented from moving axially by the shoulders of the collars. The rods may be supported at any number of intermediate points in their length by means of bearing collars mounted in partitions of the cabinet. The front ends of the rods 5 project beyond the collars 58, are twisted at 63 through an angle of 90°, and the extremity of each rod engages within a vertical slot 64 in the lower part of a vertical lever 65 pivotally hung or fulcrumed at its upper end so as to be adapted to turn in the longitudinal direction of the cabinet, as shown by dotted lines in Figure 8. The levers 65 are disposed side by side across the chamber 60 and may conveniently comprise U-section bars having in their upper ends slots 66 engaging fulcrum pins 67 fitted in the top portion 68 of the chamber 60, the levers being retained on the fulcrum pins by a bar or strap 69.

The front of the chamber 60 is closed by a cover 70 secured to the cabinet by screws or the like, and this cover carries a series of sliding keys for operating the rods, constituting a key-board. In the example represented, which is intended to be used with cards bearing numbers up to 999, three rows of keys are employed bearing numbers from 0 to 9, the top row 71 indicating hundreds, the middle row 72 indicating tens, and the bottom row 73 indicating units. The keys comprise heads carried by horizontally-sliding flat shanks 74 slidably mounted in slots in the cover 70 and in corresponding slots in a back casing 75, transverse guide pins 76 being carried by this casing and passing through slots 77 in the key shanks so as to limit the movement of the keys. The keys of the three rows are staggered with respect to one another and the inner ends of the respective key shanks are disposed opposite to and engage different levers 65. By pressing any key inwards the corresponding lever 65 is swung rearwards, as shown by dotted lines in Figure 8, so that its slot 64 moves over the twisted part 63 of a rod 5 and causes the latter to be turned through an angle of 90° into a vertical card-releasing position. By manipulating the appropriate keys the rods corresponding to the restricted slots 3 of any particular numbered card can be turned into a vertical position and can then be ejected from the cabinet by the means previously described.

Instead of the keys bearing numerals, they may be marked with letters if the cards are distinguished by names instead of numbers.

In order to turn the whole of the bars 5 into a vertical position for the purpose of loading or unloading the cards into and from the cabinet, there is disposed in front of the lower ends of the levers 65 a transverse universal bar 78 carried at opposite ends by lever arms 79 pivoted at 80 to the sides of the chamber 60, the said bar 78 carrying a pair of laterally-spaced depending lugs 81 adapted to be respectively engaged by two laterally-spaced keys 82 disposed below the main keyboard (see Figure 8), each of the said keys sliding in a casing or bracket 83 fixed to the cover 70 and its movement being limited by a pin 84 engaging a slot 85 in the shank of the key. By depressing these keys 82 the universal bar 78 is moved rearwards and forces back the whole of the levers 65, thus turning all the rods 5 into a vertical position. A stop 86 limits the forward return movement of the universal bar 78.

In order to move the whole of the rods 5 into a horizontal card-locking position, such as after the cards have been loaded into the cabinet, or after any card has been replaced, a second universal bar 87 is employed behind the levers 65, the same being carried by end lever members 88 pivoted at 89 to the side of the cabinet and each having an operating arm 90 extending through slots in the cover 70. By pressing these arms rearwards the bar 87 is caused to swing in a forward direction so as to move the levers 65 into their normal vertical position, thus restoring the bars 5 to their horizontal card-retaining positions.

Having fully described my invention, what I desire to claim and secure by Letters Patent is:—

1. A selective card or like cabinet comprising a container, means for locking a number of cards or like elements within the container, means for selecting and releasing any particular element from the locking means, a series of movable ejecting members corresponding to the different cards or the like and above which the respective cards or the like are individually supported, and means acting upon the ejecting members to cause certain members to eject any desired card or the like when said card or the like has been released from its locking device by the operation of the selecting and releasing means.

2. A selective card or like cabinet comprising a container, means for locking a number of cards or like elements within the container, means for selecting and releasing any particular element from the locking means, a series of movable ejector members corresponding to the different cards or the like and above which the respective cards or the like are individually supported, and a spring acting on each ejector member to cause any desired card or the like to be ejected when said card or the like has been released from its locking device by the operation of the selecting and releasing means.

3. A selective card or like cabinet comprising a container, means for locking a number of cards or like elements within the container, means for selecting and releasing any particular element from the locking means, a series of spring-actuated ejector slides corresponding to the different cards or the like and above which the respective cards or the like are individually supported, mechanism for normally holding the said ejector slides inoperative upon the cards or the like but which is adapted to render the said ejecting slides operative upon the cards or the like so as to cause any desired card or the like to be ejected when said card or the like has been released from its locking device by the operation of the selecting and releasing means.

4. A selective card or like cabinet comprising a container, means for locking a number of cards or like elements within the container, means for selecting and releasing any particular element from the locking means, a series of spring-actuated ejector members corresponding to the different cards or the like and above which the respective cards or the like are individually supported, mechanism for normally holding the ejector members in a lowered and inoperative position but which is adapted to be operated to release the said ejector members in successive stages throughout the series and enable the springs of ejector members appertaining to a card or the like which has been released from its locking means to raise the said members and lift the said card or the like above the other cards or the like in the container.

5. A selective card or like cabinet comprising a container, means for locking a number of cards or like elements within the container, means for selecting and releasing any particular element from the locking means, a series of movable ejector members corresponding to the different cards or the like and above which the respective cards or the like are individually supported, springs acting upon the individual ejector members tending to raise the same, and means acting upon the ejector members for normally holding them in a lowered and inoperative position, the said means being adapted to be operated to release the ejector members to enable the springs of the ejector members appertaining to a card or the like which has been released from its locking means to raise the said members and lift the said card or the like, and also being adapted to be operated to again lower the raised ejector members and retain the same in an inoperative position.

6. A selective card or like cabinet comprising a container, means for locking a number of cards or like elements within the container, means for selecting and releasing any particular element from the locking means, a series of side-by-side vertically-movable ejector members corresponding to the different cards or the like and above which the respective cards or the like are individually supported, springs acting upon the individual ejector members tending to raise the same, levers engaging the ejector members, springs acting upon the levers to cause the latter to hold the ejector members normally in a lowered inoperative position, and cams operable to cause the levers to be raised to relieve the downward pressure upon the ejector members and enable the latter to press upwards upon the cards or like elements and raise any element that may have been released from its locking means.

7. A selective card or like cabinet comprising a container, means for locking a number of cards or like elements within the container, means for selecting and releasing any particular element from the locking means, a series of side-by-side vertically-movable ejector slides corresponding to the different cards or the like and above which the respective cards or the like are individually supported, springs acting upon the individual ejector slides tending to raise the same, the springs of groups of adjacent ejector slides being disposed side by side in the transverse direction of the apparatus and being offset in the longitudinal direction relatively to one another by amounts corresponding to the thickness of the slides, and means acting upon the ejector slides for normally holding them in a lowered and inoperative position, the said means being adapted to be operated to release the ejector slides to enable the springs of the ejector slides appertaining to a card or the like which has been released to raise the said members and lift the said card or the like.

8. A selective card or like cabinet comprising a container, means for locking a number of cards or like elements within the container, means for selecting and releasing any particular element from the locking means, a series of side-by-side vertically-movable ejector slides corresponding to the different cards or the like and above which the respective cards or the like are individually supported, the said ejector slides having upstanding lugs of which those of groups of adjacent slides are successively displaced laterally relatively to one another, means for guiding the slides, vertically-disposed tension springs connected to the respective lugs of the ejector slides tending to raise the latter, the springs of groups of adjacent ejector slides being disposed side by side in the transverse direction of the apparatus and being offset in the longitudinal direction relatively to one another by amounts corresponding to the thickness of the slides, and means acting upon the ejector slides for normally holding them in a lowered and inoperative position, the said means being adapted to be operated to release the ejector slides to enable the springs of the ejector slides appertaining to a card or the like which has been released to raise the said members and lift the said card or the like.

9. A selective card or like cabinet comprising a container, means for locking a number of cards or like elements within the container, means for selecting and releasing any particular element from the locking means, a series of side-by-side vertically-movable ejector slides corresponding to the different cards or the like and above which the respective cards or the like are individually supported, the said ejector slides having upstanding lugs of which those of groups of adjacent slides are successively displaced laterally relatively to one another, means for guiding the slides, vertically disposed tension springs connected to the respective lugs of the ejector slides tending to raise the latter, the springs of groups of adjacent slides being disposed side by side in the transverse direction of the apparatus and being displaced in the longitudinal direction relatively to one another by amounts corresponding to the thickness of the slides, levers engaging the ejector slides and having depending lugs displaced in a plurality of longitudinal groups, tension springs connected to the said depending lugs of the levers and disposed in a plurality of rows corresponding to the groups of lugs, the said springs causing the levers normally to hold the ejector slides in a lowered inoperative position, and cams operable to cause the levers to be raised to relieve the downward pressure upon the ejector slides and enable the latter to press upwards upon the cards or the like and raise any element that may have been released.

10. A selective card or like cabinet comprising a container, means for locking a number of cards or like elements within the container, means for selecting and releasing any particular element from the locking means, a series of side-by-side vertically-movable ejector slides corresponding to the different cards or the like and each provided with a lateral lug adapted to support an individual card or the like, springs acting upon the individual ejector slides tending to raise the same, spring-actuated members acting upon the ejector slides for normally holding them in a lowered position, and means for relieving the pressure of the spring-actuated members from the said slides.

11. A selective card or like cabinet comprising a container, means for locking a number of cards or like elements within the container, means for selecting and releasing any particular element from the locking means, a series of side-by-side vertically-movable ejector slides corresponding to the different cards or the like and above which the respective cards or the like are supported, springs acting upon the individual ejector slides tending to raise the same, a plurality of side-by-side levers each of a thickness such as to engage a plurality of ejector slides, springs acting upon the levers to cause the latter to hold the ejector slides normally in a lowered position, and cams operable to cause the levers to be raised to relieve the downward pressure upon the ejector slides.

12. A selective card or like cabinet comprising a container, means for locking a number of cards or like elements within the container, means for selecting and releasing any particular element from the locking means, a series of side-by-side vertically-movable ejector members corresponding to the different cards or the like and above which the respective cards or the like are supported, springs acting upon the individual ejector slides tending to raise the same, a plurality of side-by-side levers engaging the ejector members, springs acting upon the levers to cause the latter to hold the ejector members normally in a lowered position, a rotatable shaft, a plurality of cams upon the shaft angularly displaced relatively to one another in spiral formation, said cams being adapted to engage the respective levers, and means for rotating the shaft to cause the levers to be raised by the cams to relieve the downward pressure upon the ejector members.

13. A selective card or like cabinet comprising a container, means for locking a number of cards or like elements within the container, means for selecting and releasing any particular element from the locking means, a row of laterally-adjacent ejector members at each side of the container disposed beneath the respective cards or the like, springs acting upon the individual ejector members tending to raise the same, two rows of levers engaging the respective rows of ejector members, springs acting on the levers to cause the latter to hold the ejector members normally in a lowered position, two sets of cams adapted to act on the respective rows of levers to raise the same and mounted on separate rotatable shafts, gearing connecting the shafts, and an exterior actuating lever for operating the shafts.

14. A selective card or like cabinet comprising a container, means for locking a number of cards or like elements within the container, means for selecting and releasing any particular element from the locking means, a series of vertically-movable ejector slides, disposed beneath the respective cards or the like, a guide bar upon which the slides are mounted and by which they are guided, means for moving the guide bar in a vertical direction, springs acting upon the individual ejector slides tending to raise the same, levers engaging the slides, springs acting on the levers to cause the latter to hold the slides in a lowered position, and cams adapted to act on the levers to raise the same.

15. A selective card or like cabinet comprising a container, means for locking a number of cards or like elements within the container, means for selecting and releasing any particular element from the locking means, a series of vertically-movable ejector slides disposed beneath the respective cards or the like, a guide bar carrying the slides and mounted for vertical movement in slots in a supporting part, springs normally maintaining the bar in a raised position, means for depressing the bar against the action of the springs, springs acting upon the individual ejector slides tending to raise the same, and means for holding the ejector slides in a lowered position and for releasing the same to allow them to act upon the cards.

16. A selective card or like cabinet comprising a container, means for locking a number of cards or like elements within the container, means for selecting and releasing any particular element from the locking means, a series of vertically-movable ejector slides disposed beneath the respective cards or the like, a guide bar carrying the slides and mounted for vertical movement in slots in a supporting part, springs normally maintaining the bar in a raised position, levers acting on the bar to depress the same, cams acting on the levers, means for operating the cams, springs acting on the individual ejector slides tending to raise the same, and means for holding the ejector slides in a lowered position and for releasing the same to allow them to act upon the cards.

17. A selective card or like cabinet comprising a container, means for locking a number of cards or like elements within the container, means for selecting and releasing any particular element from the locking means, a row of laterally-adjacent vertically-movable ejector slides at each side of the container, two guide bars upon one of which each respective row of ejector slides is mounted, a supporting part for each bar, the same having slots for vertical movement of the bars, springs normally maintaining the bars in a raised position, levers acting on the bars to depress the same, cams acting on the levers, gearing between the cams for the respective guide bars, a lever operating the cams, springs acting on the individual ejector slides tending to raise the same, and means for holding the ejector slides in a lowered position and for releasing the same to allow them to act upon the cards.

18. In a selective card cabinet, the combination of a plurality of rods in section having a long and a short axis, means whereby the long axis of the rods can be made to take up either a vertical or a horizontal position, cards each having a plurality of non-lockable edge notches corresponding to some of the rods and a number of lockable edge notches corresponding to the remainder of such rods, a series of movable ejecting members corresponding to the different cards and upon which the respective cards are individually supported, and springs acting upon the ejecting members to cause the said members to eject any card which has been released from locking engagement with the rods.

19. In a selective card cabinet, the combination with a plurality of rods in section having a long and a short axis, means whereby the long axis of the rods can be made to take up either a vertical or a horizontal position, cards each having a plurality of non-lockable edge notches corresponding to some of the rods and a number of lockable edge notches corresponding to the remainder of such rods, a series of vertically-movable ejector members corresponding to the different cards and above which the respective cards are individually supported, springs acting upon the individual ejector members tending to raise the same, means for normally holding the ejector members inoperative upon the cards but which is adapted to be operated to render the said members operative upon the cards so as to cause any desired card to be raised when the same has been released from locking engagement with the rods.

20. In a selective card cabinet, the combination with a plurality of rods in section having a long and a short axis, means whereby the long axis of the rods can be made to take up either a vertical or a horizontal position, cards each having a plurality of non-lockable edge notches corresponding to some of the rods and a number of lockable edge notches corresponding to the remainder of such rods, a series of vertically-movable ejector members corresponding to the different cards and above which the respective cards are individually supported, springs acting upon the individual ejector members tending to raise the same, levers engaging the ejector members, springs acting upon the levers to cause the latter to hold the ejector members normally in a lowered position, and cams operable to cause the levers to relieve the downward pressure upon the ejector members and enable the latter to press upwards upon the cards and raise any card that may have been released from locking engagement with the rods.

In testimony whereof I have affixed my signature.

EDGAR WORRALL TAYLOR.